(12) United States Patent
Duong et al.

(10) Patent No.: US 8,340,435 B2
(45) Date of Patent: Dec. 25, 2012

(54) METHOD AND SYSTEM FOR OBJECT RECOGNITION SEARCH

(75) Inventors: Tuan A. Duong, Glendora, CA (US); Vu A. Duong, Rosemead, CA (US); Allen R. Stubberud, Irvine, CA (US)

(73) Assignee: California Institute of Technology, Pasadena, CA (US)

( * ) Notice: Subject to any disclaimer, the term of this patent is extended or adjusted under 35 U.S.C. 154(b) by 323 days.

(21) Appl. No.: 12/796,631

(22) Filed: Jun. 8, 2010

(65) Prior Publication Data

US 2010/0316287 A1    Dec. 16, 2010

Related U.S. Application Data

(60) Provisional application No. 61/186,304, filed on Jun. 11, 2009.

(51) Int. Cl.
*G06K 9/46* (2006.01)
(52) U.S. Cl. ............ 382/203; 382/190; 382/195
(58) Field of Classification Search .......... None
See application file for complete search history.

(56) References Cited

U.S. PATENT DOCUMENTS

| | | | |
|---|---|---|---|
| 6,111,517 A | 8/2000 | Atick et al. | |
| 6,597,801 B1 * | 7/2003 | Cham et al. | 382/103 |
| 6,795,567 B1 * | 9/2004 | Cham et al. | 382/103 |
| 6,882,756 B1 | 4/2005 | Bober | |
| 6,980,697 B1 * | 12/2005 | Basso et al. | 382/274 |
| 7,171,023 B2 | 1/2007 | Kim et al. | |
| 7,177,446 B2 * | 2/2007 | Magarey | 382/103 |
| 7,403,652 B2 | 7/2008 | Boncyk et al. | |
| 7,940,956 B2 * | 5/2011 | Kinoshita et al. | 382/103 |
| 7,957,557 B2 * | 6/2011 | Otsu et al. | 382/103 |
| 7,996,409 B2 * | 8/2011 | Hsu et al. | 707/748 |
| 8,170,280 B2 * | 5/2012 | Zhao et al. | 382/103 |
| 2003/0099376 A1 | 5/2003 | Kim et al. | |
| 2006/0110034 A1 | 5/2006 | Boncyk et al. | |
| 2006/0222213 A1 * | 10/2006 | Kiyohara et al. | 382/115 |
| 2006/0251292 A1 * | 11/2006 | Gokturk et al. | 382/103 |
| 2008/0187172 A1 * | 8/2008 | Otsu et al. | 382/103 |
| 2009/0141940 A1 * | 6/2009 | Zhao et al. | 382/103 |
| 2009/0167877 A1 * | 7/2009 | Imamura | 348/208.4 |

FOREIGN PATENT DOCUMENTS

WO    0108449    11/2001

OTHER PUBLICATIONS

Smeraldi, F. et al., "Facial feature detection by saccadic exploration of the Gabor decomposition", Image Processing, ICIP Proceedings Internaiional Conference on Chicago, IL, USA, IEEE Comput. Soc. 1998, pp. 163-167, vol. 3.*
PCT International Search Report for PCT/US2007/015227 filed on Jun. 29, 2007 in the name of Duong, et al.
PCT Written Opinion for PCT/US2007/015227 filed on Jun. 29, 2007 in the name of Duong, et al.

(Continued)

*Primary Examiner* — Chan S Park
*Assistant Examiner* — Sean Motsinger
(74) *Attorney, Agent, or Firm* — Steinfl & Bruno LLP

(57) ABSTRACT

A method for object recognition using shape and color features of the object to be recognized. An adaptive architecture is used to recognize and adapt the shape and color features for moving objects to enable object recognition.

20 Claims, 12 Drawing Sheets

OTHER PUBLICATIONS

Non-Final Office Action for U.S. Appl. No. 11/498,531 filed on Aug. 1, 2006 in the name of Doung, et al.

Notice of Allowance for U.S. Appl. No. 11/498,531 filed on Aug. 1, 2006 in the name of Doung, et al.

Serre, T., et al. Robust Object Recognition with Cortex-Like Mechanisms, IEEE Transactions on Pattern Analysis and Machine Intelligence, 2007, 29: 411-426.

Fukushima, K. Neocogniton: A Self-organizing Neural Network Model for a Mechanism of Pattern Recognition Unaffected by Shift in Position, Biological Cybernetics, 1980, 36: 193-202.

LeCun, Y., et al., Gradient-Based Learning Applied to Document Recognition, Proceedings of the IEEE, 1998, 86: 2278-2324.

Riesenhuber, M., et al., Hierarchical Models of Object Recognition in Cortex, Nature, 1999, 2: 1019-1025.

Perrett, D.I., et al., Neurophysiology of Shape Processing, image and Vision Computing, 1993, 11: 317-333.

Wallis, G., et al., Invariant Face and Object Recognition in the Visual System, Progress in Neurobiology, 1997, 51: 167-194.

Thorpe, S., Ultra-rapid Scene Categorization with a Wave of Spikes, LNCS, 2002, 2525: 1-15.

Amit Y., et al., An integrated network for invariant visual detection and recognition, Vision Research, 2003, 43: 2073-2088.

Weber, M., Unsupervised Learning of Models for Object Recognition, California Institute of Technology, 2000, 1-127.

Mel, B.W., Seemore: Combining Color, Shape, and Texture Histogramming in a Neurally Inspired Approach to Visual Object Recognition, Neural Computation, 1997, 9: 777-804.

Abu-Mostafa, Y., Hints and the VC Dimension, Neural Computation, 1993, 5: 278-288.

Chua, L., et al., Cellular Neural Networks: Theory, IEEE Transactions on Circuits and Sytems, 1988, 35: 1257-1272.

Sharon, E., et al., Hierarchy and Adaptivity in Segmenting Visual Scenes, Nature, 2006, 442: 810-813.

Gevers, T., et al., PicToSeek: Combining Color and Shape Invariant Features for Image Retrieval, IEEE Transactions on Image Processing, 2000, 9: 102-119.

Jain, A., et al., Image Retrieval using Color and Shape, May 15, 1995, Michigan State University, 1-24.

Dyer, A.G., et al., Biological significance of distinguishing between similar colours in spectrally variable illumination: bumblebees (*Bombus terrestris*) as a case study, Journal of Comparative Physiology, 2003, 190: 105-114.

Baddeley, R., et al., Proc. R. Soc. Lond. B., 1991, 246: 219-223.

Baddeley, R., An Efficient Code in V1?, Nature, 1996, 381: 560-561.

Baldi, P., et al., Learning in Linear Neural Networks: A Survey, IEEE Transactions on Neural Networks, 1995, 6: 838-859.

Werblin, F., et al., Using CNN to Unravel Space-Time Processing in the Vertebrate Retina, $3^{rd}$ IEEE International Workshop on Cellular Neural Networks and their Applications, 1994: 33-40.

Jain, A., et al., Statistical Pattern Recognition: A Review, IEEE Transactions on Pattern Analysis and Machine Intelligence, 2000, 22: 4-37.

Bannour, S., et al., Principal Component Extraction Using Recursive Least Squares Learning, IEEE Transactions on Neural Networks, 1995, 6: 457-469.

Oja, E., et al., On Stochastic Approximation of the Eigenvectors and Eigenvalues of the Expectation of a Random Matrix, Journal of Mathematical Analysis and Applications, 1985, 106: 69-84.

Xu, L., Least Mean Square Error Reconstruction Principle for Self-oragnizing Neural-nets, Neural Networks, 1993, 6: 627-648.

Konishi, R., et al., PCA-1: A Fully Asynchronous, Self-Reconfigurable LSI, IEEE, 2001, 54-61.

Ito, H., et al., Dynamically Reconfigurable Logic LSI-PCA-1, 2001 Symposium on VLSI Circuits, Digest of Technical Papers, 2001, 103-106.

Duong, T.A., et al., Sequential Principal Component Analysis—A Hardware-Implementable Transform for Image Compression, $3^{rd}$ IEEE International Conference on Space Mission Challenges for Information Technology, 2009, 362-366.

Celenk, M, A Color Clustering Technique for Image Segmentation, Computer Vision, Graphics, and Image Processing, 1990, 52: 145-170.

Liu, J., et al., Multiresolution Color Image Segmentation, IEEE Transactions on Pattern Analysis and Machine Intelligence, 1994, 16: 689-700.

Littman, E., et al., Adaptive Color Segmentation—A Comparison of Neural and Statistical Methods, IEEE Transactions on Neural Netwoks, 1997, 8: 176-186.

Perez, F., et al., Toward Color Image Segmentation in Analog VLSI: Algorithm and Hardware, International Journal of Computer Vision, 1994, 12: 17-42.

Healey, G., Segmenting Images Using Normalized Color, IEEE Transactions on Systems, Man, and Cybernetics, 1992, 22: 64-73.

Okii, H., et al., Automatic Color Segmentation Method Using a Neural Network Model for Stained Images, IEICE Transactions on Information and Systems, 1994, E77: 343-350.

Nakamura, T., et al., On-Line Visual Learning Method for Color Image Segmentation and Object Tracking, Proceedings of the 1999 IEEE/RSJ International Conference on Intelligent Robots and Systems, 1999, 222-228.

Batavia, P., et al., Obstacle Detection Using Adaptive Color Segmentation and Color Stereo Homography, Proceedings of the 2001 IEEE International Conference on Robotics and Automation, 2001, 705-710.

Duong, T., et al., Real Time Adaptive Color Segmentation for Mars Landing Site Identification, Journal of Advanced Computational Intelligence and Intelligent Informatics, 2003, 7: 289-293.

Duong, T., et al., Convergence Analysis of Cascade Error Projection—An Efficient Learning Algorithim for Hardware Implementation, International Journal of Neural System, 2000, 10: 199-210.

Palmer, S., Hierarchical Structure in Perceptual Representation, Cognitive Psychology, 1977, 9: 441-474.

Wachsmuth, E., et al., Recognition of Objects and Their Component Parts: Responses of Single Units in the Temporal Cortex of the Macaque, Cerebral Cortex, 1994, 5: 509-522.

Lee, D., et al. Learning the Parts of Objects by Non-negative Matrix Factorization, Nature, 1999, 401: 788-791.

Biederman, I., Recogniton-by-Components: A Theory of Human Image Understanding, Psychological Review, 1987, 94:115-147.

Werblin, F., et al. The Analogic Cellular Neural Network as a Bionic Eye, International Journal of Circuit Theory and Applications, 1995, 23: 541-569.

Fiesler, E., et al., Color Sensor and Neural on One Chip, SPIE, 1998, 3455: 214-225.

Bell, A., et al., An Information-maximisation Approach to Blind Separation and Blind Deconvolution, Neural Computation, 1995, 7: 1129-1166.

Cardoso, J., High-Order Contrasts for Independent Component Analysis, Neural Computation, 1999, 11: 157-192.

Chatterjee, C., et al., Algorithms for Accelerated Convergence of Adaptive, 2000, IEEE Transactions on Neural Networks, 2000, 11: 338-355.

Chauvin, Y., Principal Component Analysis by Gradient Descent on a Constrained Linear Hebbian Cell, Proceedings of Joint International Conference of Neural Networks, 1989, 1: 373-380.

Cichocki, A., et al. Robust Estimation of Principal Components by Using Neural Networks Learning Algorithms, Electronics Letters, 1993, 29: 1869-1870.

Comon, P., Independent Component Analysis, A New Concept?, 1994, Signal Processing, 36: 287-314.

Duong, T., Convergence Analysis of Cascade Error Projection—An Efficient Learning Algorithm for Hardware Implementation, UCI Ph. D. Thesis, 1995, 1-11.

Duong, T., et al., Learning in Neural Networks: VLSI Implementation Strategies, Fuzzy Logic and Neural Networks Handbook, 1996, Ch. 26:1-60.

Friedman, J., Exploratory Projection Pursuit, Journal of the American Statistical Association, 1987, 82: 249-266.

Fu, Z., et al., Conjugate Gradient Eigenstructure Tracking for Adaptive Spectral Estimation, IEEE Transactions on Signal Processing, 1995, 43: 1151-1159.

Miao, Y., Comments on Principal Component Extraction Using Recursive Least Squares Learning, IEEE Transactions on Neural Networks, 1996, 7: 1052-1053.

Oliveira, P., et al., A Comparision between PCA Neural Networks and the JPEG Standard for Performing Image Compression, IEEE, 1997, 112-116.

Sanger, T.D., Optimal Unsupervised Learning in a Single-Layer Linear Feedforward Neural Network, Neural Networks, 1989, 2: 459-473.

\* cited by examiner

FIG. 4A          FIG. 4B          FIG. 4C
FIG. 5A          FIG. 5B          FIG. 5C
FIG. 6A          FIG. 6B          FIG. 6C

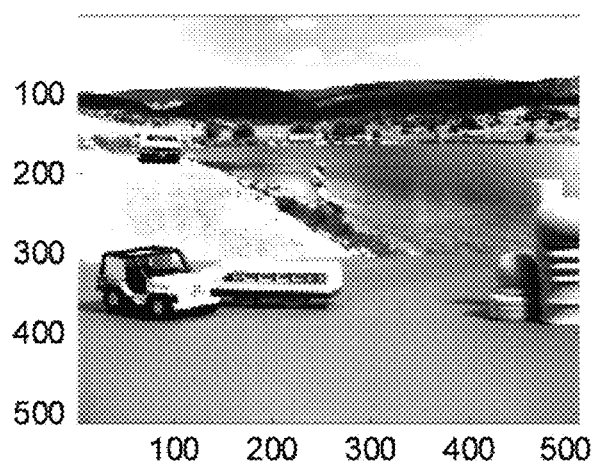
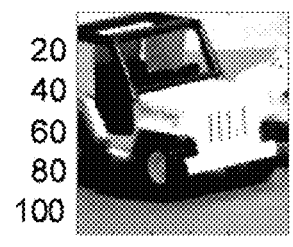
FIG. 11B
FIG. 11A
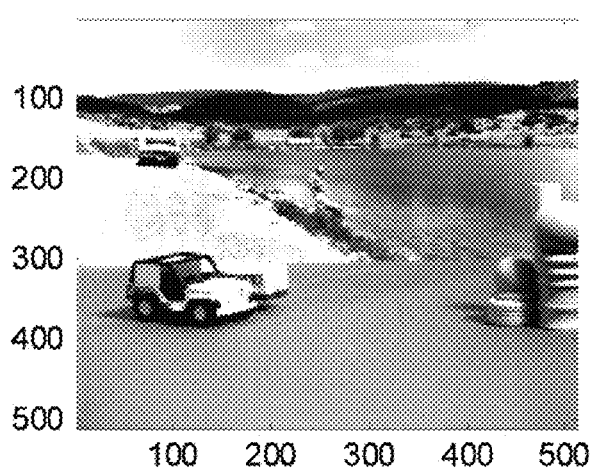
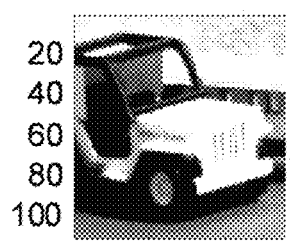
FIG. 12B
FIG. 12A

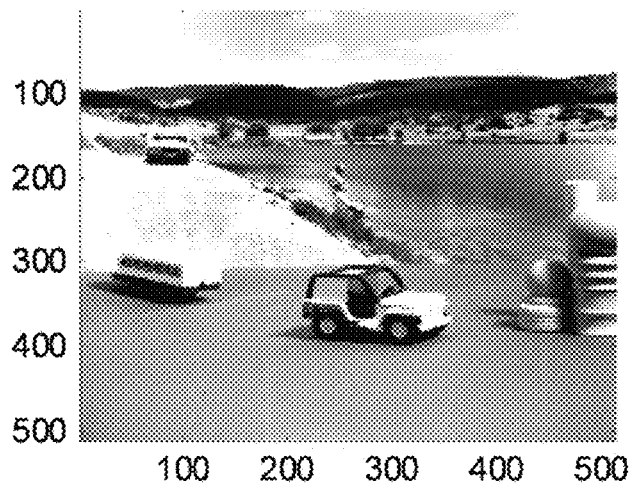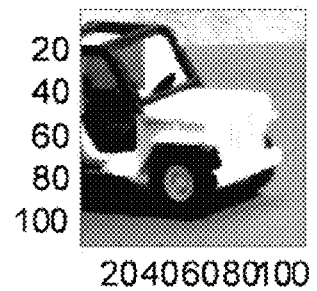
FIG. 13A
FIG. 13B
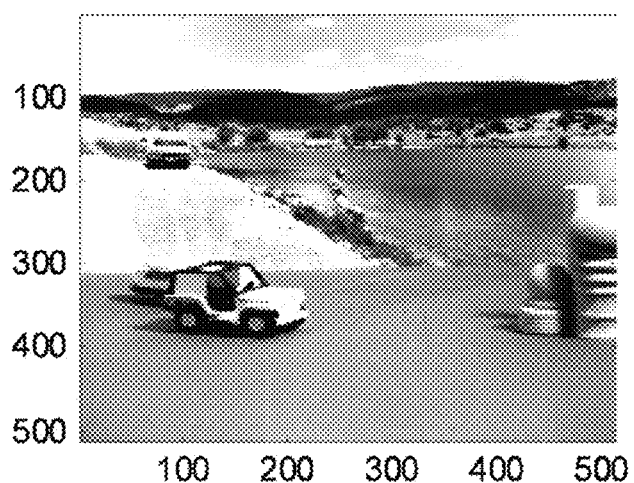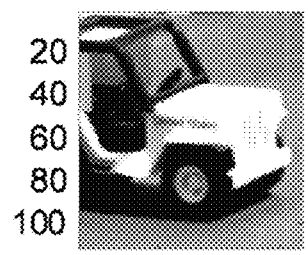
FIG. 14A
FIG. 14B

METHOD AND SYSTEM FOR OBJECT RECOGNITION SEARCH

CROSS-REFERENCE TO RELATED APPLICATIONS

This application is related to and claims the benefit of the following copending and commonly assigned U.S. Provisional Patent Application: U.S. Patent Application No. 61/186,304, titled "Shape and Color Features for Object Recognition Search," filed on Jun. 11, 2009; the entire contents of which is incorporated herein by reference.

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

BACKGROUND

1. Field

This disclosure relates to object recognition search. More particularly, the present disclosure describes feature extraction techniques that are used to facilitate object recognition and search. The present disclosure also describes architectures and systems that are particularly adapted for the recognition and search of moving objects.

2. Description of Related Art

While humans are well-adapted for object recognition, machine or computer-based object recognition is a challenging problem. Several different approaches have been the subject of much investigation. These approaches include: bio-related methods, shape and color features based approaches, and image retrieval based shape and color feature methods. Bio-related methods have been described by Thomas Serre, Lior Wolf, Stanley Bileschi, Maximilian Riesenhuber, and Tomaso Poggio, in "Robust Object Recognition with Cortex-Like Mechanisms", IEEE Transactions On Pattern Analysis And Machine Intelligence, Vol. 29, No. 3, 411-426, March 2007; by Fukushima, K., in "Neocognitron: a self-organizing neural network model for a mechanism of pattern recognition unaffected by shift in position," Biol. Cybern., 36: 193-202 (1980); by Riesenhuber, M. and Poggio, T., in "Hierarchical models of object recognition in cortex". Nat. Neurosci., 2: 1019-1025 (1999); and Perrett, D. I. and Oram, M., in "Neurophysiology of shape processing," Image Vis. Comput., 11: 317-333 (1993). Shape and color features based approaches have been described by B. W. Mel, in "SEEMORE: Combining Color, Shape, and Texture Histogramming in a Neurally Inspired Approach to Visual Object recognition," Neural Computation, 9, pp. 777-804, 1997 and by Eitan Sharon, Meirav Galun, Dahlia Sharon, Ronen Basri & Achi Brandt, in Nature, Vol 442.17, 810-813, August 2006. Image retrieval based shape and color feature methods have been described by Theo Gevers and Arnold W. M. Smeulders, in "PicToSeek: Combining Color and Shape Invariant Features for Image Retrieval," IEEE Transactions On Image Processing, Vol. 9, No. 1, pp. 102-119, January 2000, and by A. K. Jain and A. Vailaya, in "Image retrieval using color and shape" Pattern Recognition, vol. 29, pp. 1233-1244, 1996. Since the shape and color features of a given object can uniquely define its characteristics and they also agree with biological models, these approaches are strongly related.

From a physical perspective, an electronic image of an object is a collection of photon reflections from the surface of that object with respect to a fixed camera position. If the object moves and the motion/rotation of the surface of the object are sufficiently small, a new collection of photon reflections may not be correlated with the previous reflections from a pixel-wise view point; however, they still maintain a strong correlation with a global view of the object. To obtain a global view of an object, the shape feature is the logical building block to be used and the color feature, if available, provides additional information. Moreover, for different lighting conditions and different light absorption properties of the various materials in the object, it reflects and absorbs differently, so that the object color provides a unique response. When the object moves in an evolving light environment, the color response will change locally with respect to its previous response.

Shape Feature Extraction

For problems with rich data sources such as image recognition and computer vision, the dimension of the input vector is typically larger than the number of input samples, which leads to overfitting of the data if no care is taken to achieve useful generalization. Furthermore, computing power rapidly becomes insufficient to process the data within a reasonable time. To overcome these two obstacles, a preprocessing step may be effective in the following two ways: (1) non-useful and redundant data are eliminated, thus enhancing the operational processing step; and, (2) the salient feature can be selected, thus improving the recognition capability.

Support vector machines, learning by hints, Principal Component Analysis (PCA) and Cellular Neural Networks (CNN) all reduce the dimension of the input vector set with little or no significant loss of information. Such data extraction methods also have the advantage of eliminating some irrelevant data, such as small amplitude noise, and speeding up the classification step. Sequential PCA is a tool that may require less computation and be more hardware friendly to enable real time feature extraction for real time adaptive capability.

Principal Component Analysis (PCA) is a second order statistical approach, which can been used to extract the features of a data set (see, for example, A. K. Jain, R. P. W. Duin, and J. Mao "Statistical Pattern Recognition: A Review", IEEE Transactions on Pattern Analysis and Machine Intelligence, Vol. 22, NO. 1, January 2000) or to perform data compression (see, for example, T. A. Duong "Real Time On-Chip Sequential Adaptive Principal Component Analysis for Data Feature Extraction and Image Compression", GOMAC Tech-03, Vol. I, pp. 460-464, Tampa, Fla., 31 March-3 April, 2003; T. A. Duong and V. A. Duong, "Sequential Principal Component Analysis—An Optimal and Hardware-Implementable Transform for Image Compression", 3rd IEEE Space Mission Challenges for Information Technology in Pasadena, Calif., 19-23 July, 2009; and S. Bannour and M. R. Azimi-Sadjadi, "Principal Component Extraction Using Recursive Least Squares Learning," IEEE Trans. On Neural Networks, Vol. 6, No. 2, March 1995). Especially, when the data set is Gaussian, redundant and overwhelmingly large, PCA is a very effective preprocessing step to extract data features for classification and/or to cluster data in the most compact energy vectors for data compression. Unfortunately, PCA requires that the basis vectors be orthogonal, which is typically an artificial assumption.

The PCA procedure is complicated and computationally intensive ($O(N3)$, where N is the dimension of the vector input), thereby making it difficult to use for rich data sources. To get over the hurdles from the traditional PCA technique, simple sequential PCA techniques have been developed (see, for example, E. Oja and J. Karhunen, "On stochastic approximation of the eigenvectors and eigenvalues of the expectation of a random matrix." J. Math. Anal. Appl., vol. 106, pp. 69-84, 1985). These techniques are based on a learning approach that sequentially obtains principal component vectors. Some works in PCA are reported using Hebbian or anti-Hebbian learning (see, for example, S. Haykin, Neural Network—A Comprehensive Foundation. New York: Macmillan, 1994, and P. Baldi and K. Hornik, "Learning in linear neural networks: A survey," IEEE Trans. Neural Networks, Vol. 6, pp. 837-857, 1995) and gradient-based learning (see, for example, S. Bannour and M. R. Azimi-Sadjadi, "Principal Component Extraction Using Recursive Least Squares Learning," IEEE Trans. On Neural Networks, Vol. 6, No. 2, March 1995., and L. Xu, "Least mean square error reconstruction principal for self-organizing neural-nets," Neural Networks, 6, pp. 627-648, 1993) or even the more elegant technique of natural gradient descent (see, for example, S. I. Amari., "Natural gradient works efficiently in learning," Neural Computation, 1998).

For sequential PCA, the gradient descent (GED) technique may be a more attractive approach for hardware implementation as a straight forward technique compared to others, e.g., steepest decent, conjugate gradient, or Newton's second order method, but it exposes some difficulties in learning convergence when other principal component vectors are corresponding to smaller eigen values. In addition, this technique still requires some complicated hardware.

A Dominant-Element-Based Gradient Descent and Dynamic Initial Learning Rate technique for sequential PCA has been developed. This technique serves two purposes: 1) simplified hardware implementation, especially in VLSI as System-On-A-Chip approach; and 2) fast and reliable convergence as compared with counterpart gradient descent. This technique requires much less computation and its optimized architecture is more suitable for implementing as a real time adaptive learning system in hardware.

The objective function for the Dominant-Element-Based Gradient Descent and Dynamic Initial Learning Rate technique is defined as shown in Eq. 1 below:

$$J(w) = \sum_{i=1}^{m} J_i(w_i) = \sum_{i=1}^{m} \sum_{t=1}^{k} |x_t - w_i w_i^T x_t|^2 \qquad \text{Eq. 1}$$

where m is the number of principal components, k is the number of measurement vectors, $x_t$, measured at time t and $w_i$ is the $i^{th}$ principal vector (or eigen vector).

From Eq. 1, the additional definitions shown in Eq. 2 and Eq. 3 below can be made:

$$J_i(w_i) = \sum_{t=1}^{k} |y_i^t - w_i w_i^T y_i^t|^2 \qquad \text{Eq. 2}$$

$$y_i^t = x_t - \sum_{j=1}^{i-1} w_j w_j^T x_t \qquad \text{Eq. 3}$$

From Eq. 2 and Eq. 3, the learning algorithm can be processed sequentially for each principal vector that is based on the gradient descent as shown in Eq. 4 below:

$$\Delta w_{ij} = -\frac{\partial J_i}{\partial w_{ij}} = -\frac{\partial (|y_i^t - w_i w_i^T y_i^t|^2)}{\partial w_{ij}} \qquad \text{Eq. 4}$$

From Eq. 4, only the dominant element (see T. A. Duong "Real Time On-Chip Sequential Adaptive Principal Component Analysis for Data Feature Extraction and Image Compression", GOMAC Tech-03, Vol. I, pp. 460-464, Tampa, Fla., 31 Mar.-3 Apr., 2003) is used; the weight update can be obtained as shown in Eq. 5 below:

$$w_{ij}^{new} = w_{ij}^{old} + \zeta \Delta w_{ij} = w_{ij}^{old} + \zeta \varepsilon_{ij}(w_i^T y_i^t + w_{ij} y_{ij}^t) \qquad \text{Eq. 5}$$

$$\text{where } \zeta = \frac{E_0}{E_{i-1}} \text{ and } \hat{y}_i^t = w_i w_i^T y_i^t.$$

$E_0$ is the initial energy when the network starts learning and $E_{i-1}$ is the energy of the $(i-1)^{th}$ extracted principal.

The techniques described above may be used in the extraction of shape features for object recognition. Application of these techniques to embodiments of the present invention is described below in the Detailed Description section.

Color Feature Extraction

To use the object color feature for helping in object recognition in a friendly and correlated environment, color segmentation is a suitable approach to narrow down the search space. Several color segmentation algorithms have been proposed in literature (see, for example, M. Celenk. "A Color Clustering Technique for Image Segmentation." Computer Vision Graphics Image Process. Graphical Models Image Process. 52. pp. 145-170, 1990; J. Lui and Y. H. Yang, "Multiresolution Color Image Segmentation," IEEE Trans. Patt. Anal. Mach. Intel. 16, 689-700, 1994; E. Littman and H. Ritter. "Adaptive Color Segmentation—A Comparison of Neural and Statistical Methods." IEEE Trans. Neural Net. Vol. 8, No. 1, pp. 175-185, 1997; F. Perez and C. Kock, "Toward Color Image Segmentation in Analog VLSI: Algorithm and Hardware," Int. J. Comp. Vision 12:1, 17-24, 1994; G. Healy. "Segmenting Images Using Normalized Color." IEEE Trans. Syst. Man. Cyber. 22. 1. pp. 64-73, 1992; H. Okii, et al. "Automatic color segmentation method using a neural network model for stained images," IEICE Trans. Inf. Syst. (Japan) Vol. E770D No. 3, pp. 343-350, March 1994; T. Nakamura and T. Ogasawara, "On-Line Visual Learning Method for Color Image Segmentation and Object Tracking," Proc. of The 1999 IEEE/RSJ Intelligent Robots and Systems, pp. 222-228, 1999; P. H. Batavia and S. Singh, "Obstacle Detection Using Adaptive Color Segmentation and Color Stereo Homography," Proc. Of the 2001 IEEE International Conference on Robotic and Automation, Seoul, Korea, May 21-26, 2001; E. Fiesler, S. Campbell, L. Kempen, and T. Duong. "Color Sensor and Neural Processor on One Chip." International Symposium on Optical Science, Engineering, and Instrumentation, Proc. of the SPIE, vol. 3455 'Applications and Science of Neural Networks, Fuzzy Systems, and Evolutionary Computation', pp. 214-221, 1998; T. A. Duong, "Real Time Adaptive Color Segmentation for Mars Landing Site Identification," Journal of Advanced Computational Intelligence and Intelligent Informatics (Japan), pp. 289-293, Vol. 7 No. 3, 2003).

The majority of existing color segmentation techniques are based on Red-Green-Blue (RGB) classification in combination with complex data processing. This processing includes spatial clustering to separate targets from the background, multi-histogram analysis (see, for example, M. Celenk. "A Color Clustering Technique for Image Segmentation." Computer Vision Graphics Image Process. Graphical Models Image Process. 52. pp. 145-170, 1990), Bayesian methods (see, for example, J. Lui and Y. H. Yang, "Multiresolution Color Image Segmentation," IEEE Trans. Patt. Anal. Mach. Intel. 16, 689-700, 1994), and various neural network approaches (see, for example, E. Littman and H. Ritter.

"Adaptive Color Segmentation—A Comparison of Neural and Statistical Methods." IEEE Trans. Neural Net. Vol. 8, No. 1, pp. 175-185, 1997). Algorithms have been proposed based on edge detection in color space (see, for example, F. Perez and C. Kock, "Toward Color Image Segmentation in Analog VLSI: Algorithm and Hardware," Int. J. Comp. Vision 12:1, 17-24, 1994) and normalized color space (see, for example, H. Okii, et al. "Automatic color segmentation method using a neural network model for stained images," IEICE Trans. Inf. Syst. (Japan) Vol. E770D No. 3, pp. 343-350, March 1994).

In real time applications, algorithms with fast learning and adaptive capabilities are preferred. As described in T. A. Duong and Allen R. Stubberud, "Convergence Analysis Of Cascade Error Projection—An Efficient Learning Algorithm For Hardware Implementation", International Journal of Neural System, Vol. 10, No. 3, pp. 199-210, June 2000, Cascade Error Projection (CEP) algorithm provides an excellent tool in fast and simple learning.

The CEP neural network architecture is illustrated in FIG. 1. Shaded squares 102 and circles 103 indicate frozen weights; a non-shaded square 112 indicates calculated weights, and a non-shaded circle 113 indicates learned weights. As can be seen in FIG. 1, the shaded squares 102 and shaded circles 103 indicate the learned or calculated weight set that is computed and frozen. A non-shaded circle 113 indicates that perceptron learning is applied to obtain the weight set and a non-shaded square 112 indicates that the weight set is deterministically calculated.

In the CEP algorithm, the energy function is defined as shown in Eq. 6 below:

$$E(n+1) = \sum_{p=1}^{P} \left\{ f_h^p(n+1) - \frac{1}{m}\sum_{o=1}^{m}(t_o^p - o_o^p) \right\}^2 \quad \text{Eq. 6}$$

The weight update between the inputs (including previously added hidden units) and the newly added hidden unit is calculated as shown in Eq. 7 below:

$$\Delta w_{ih}^p(n+1) = -\eta \frac{\partial E(n+1)}{\partial w_{ih}^p(n+1)} \quad \text{Eq. 7}$$

and the weight update between hidden unit n+1 and the output unit o is as shown in Eq. 8 below:

$$w_{ho}(n+1) = \frac{\sum_{p=1}^{P} \varepsilon_o^p f_o'^p f_h^p(n+1)}{\sum_{p=1}^{P} [f_o'^p f_h^p(n+1)]^2} \quad \text{with } f(x) = \frac{1-e^{-x}}{1+e^{-x}}. \quad \text{Eq. 8}$$

where m is the number of outputs and P is the number of training patterns. Error $\varepsilon_o^p = t_o^p - o_o^p(n)$; where $o_o^p(n)$ is the output element o of the actual output o(n) for training pattern p, and $t_o^p$ is the target element o for training pattern p. n indicates the number of previously added hidden units. $f'_o^p(n) = f'_o^p$ denotes the output transfer function derivative with respect to its input. $f_h^p(n+1)$ denotes the transfer function of hidden unit n+1.

The CEP algorithm is processed in two steps: (1) Single Perceptron learning which is governed by Eq. 7 to update the weight vector $W_{ih}(n+1)$; and (2) when the single Perceptron learning is completed, the weight set $W_{ho}(n+1)$ can be obtained by the calculation governed by Eq. 8. Additional details of the CEP algorithm and the convergence analysis may be found in T. A. Duong and Allen R. Stubberud, "Convergence Analysis Of Cascade Error Projection—An Efficient Learning Algorithm For Hardware Implementation", International Journal of Neural System, Vol. 10, No. 3, pp. 199-210, June 2000.

While techniques are known in the art for object detection and recognition based on either shape feature extraction and detection or color feature extraction and detection, the usefulness of these techniques for use in a heterogeneous environment may be somewhat limited. Hence, there is a need in the art for techniques that will support effective recognition in more widely varying environments.

SUMMARY

Embodiments of the present invention may use a bio-inspired features approach, an adaptive architecture and autonomous mechanism, and an effective processing technique to enable a real time adaptive visual system. From a physiological and psychological view point, there is evidence that the brain may process a sub-shape feature as a part-based shape, e.g., mouth, eyes, etc in the face, for object recognition. This is also evident in the saccadic eye movement for a part-based object. Shape feature extraction and detection according to embodiments of the present invention emulate saccadic eye movement by focusing on smaller size and smaller samples of a scene where each scene has different sample location.

One embodiment of the present invention is a method for object identification in multiple images in a series of images, the method comprising: extracting initial knowledge of color and shape features from a statistical image collection and storing the extracted color and shape features in one or more databases; performing shape feature detection and color feature detection on a first image in the series of images to identify an object and a region of interest within the first image, wherein the shape feature detection and color feature detection is based on the color and shape features stored in the one or more databases; extracting new color and shape features based on the identified region of interest and storing the new extracted color and shape features in the one or more databases; performing shape feature detection and color feature detection on a next image in the series of images to identify the object and a region of interest within the next image, wherein the shape feature detection and color feature detection is based on the color and shape features stored in the one or more databases; and repeatedly extracting new color and shape features followed by performing shape feature detection and color feature identification to identify the object in multiple images in the series of images.

Another embodiment of the present invention is a computer programmed for recognition of an object in multiple images of a series of images comprising: one or more databases for storing color and shape features extracted from a statistical image collection containing images of objects to be recognized; one or more processors programmed to extract shape features from a region of interest or an object of interest within an image and store the extracted shape features in the one or more databases; the one or more processors being further programmed to extract color features from a region of interest or an object of interest within an image and store the extracted color features in the one or more databases; the one or more processors being further programmed to detect shape features and color features within an image or a region of interest based on shape features stored in the one or more databases to recognize an object with the image or the region of interest; the one or more processors programmed to extract shape features and color features being further programmed to extract shape features and color features from the recognized object or region of interest, where the one or more processors are further programmed to provide an indication of the presence of the recognized object in one or more images of the series of images.

BRIEF DESCRIPTION OF THE SEVERAL VIEWS OF THE DRAWINGS

FIGS. 4A-4C show images in the database for the person shown in FIG. 3A.

FIGS. 5A-5C show images in the database for the person shown in FIG. 3B.

FIGS. 6A-6C show images in the database for the person shown in FIG. 3C.

FIG. 11A shows another test image and FIG. 11B shows a detected object found in the test image based on the object shown in FIG. 8.

FIG. 12A shows another test image and FIG. 12B shows a detected object found in the test image based on the object shown in FIG. 8.

FIG. 13A shows another test image and FIG. 13B shows a detected object found in the test image based on the object shown in FIG. 8.

FIG. 14A shows another test image and FIG. 14B shows a detected object found in the test image based on the object shown in FIG. 8.

DETAILED DESCRIPTION

The exemplary embodiments according to the present invention described in this disclosure provide an adaptive capability for shape recognition and color recognition based on local color and shape correlation for the recognition of a moving object in an evolving environment.

A major challenge for a color and shape feature based recognition technique is how to obtain the effective features in real time, or near real time, which enable an adaptive capability for dynamically changing objects in a 3-D environment. When the operating environment is evolving, the change of shape and color features are not guaranteed to be local or 'smooth'; however, embodiments of the present invention may rely on the assumption that at least one of them changes 'smoothly'. The feedback architecture of the recognition system uses two variables, the color and shape feature vectors, as input parameters to drive the system to optimally converge to the correct attractor i.e., to the correct object recognition.

Embodiments of the present invention may employ a feature database that has adapted and stored shape and color features. When assumptions of smoothness of shape and color features in time are violated, the feature database may be employed to search the match features from scratch as a new start.

From a biological view point, the saccadic eye movement is well understood; however, its use in visual models has not gone beyond recognition of the phenomenon. In some embodiments of the present invention, saccadic eye movements are mapped into a statistical form from which Principal Component Analysis (PCA) can be used to extract the features when a single (or multiple) visual sensor object is provided. One can view this approach as a bio-inspired model which emulates the saccadic eye movement and the horizontal layer in the retina of a vertebrate. From this modeling, the significant and salient shape features of the object of interest can be extracted.

Figure 21:
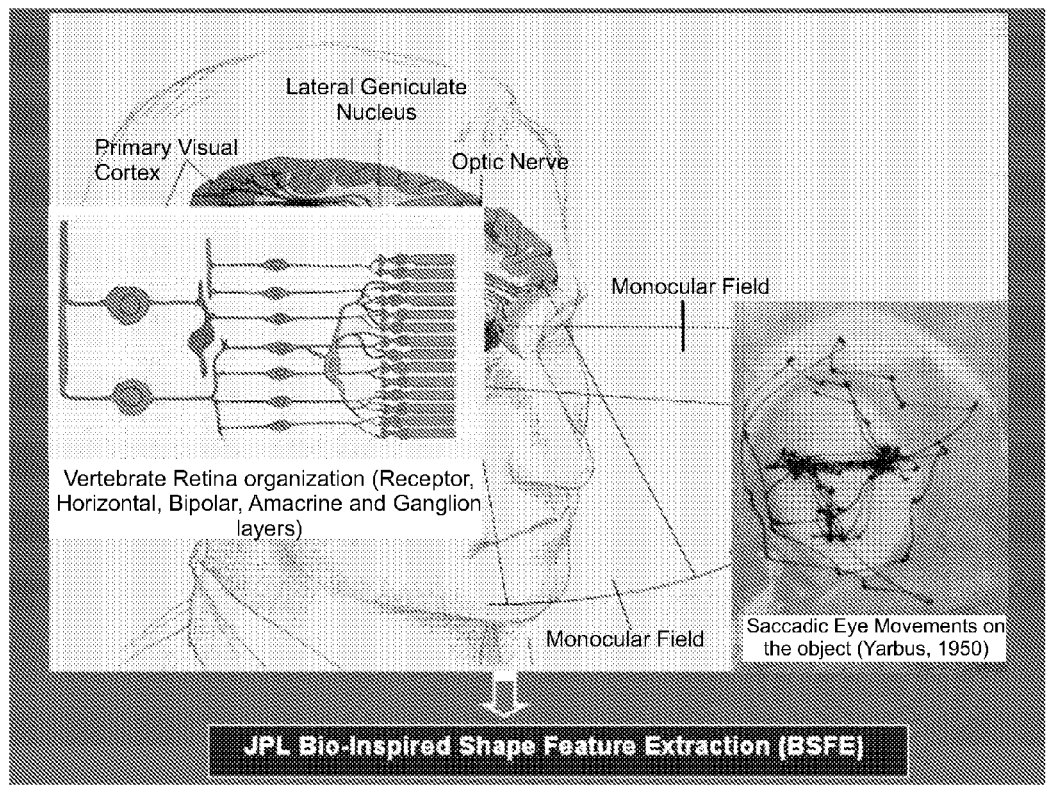
FIG. 21 depicts saccadic eye movements.

Embodiments of the present invention emulate saccadic eye movement by focusing on smaller size and smaller samples of a scene where each scene has different sample location (spatial location). From different samples based on saccadic eye movement e.g., spatial location, one can have a set of sample data to enable the statistical technique to extract the bio-inspired feature for that object. For example, an upper left corner of an image may be used as a reference. Then the spatial location of each sample image is sampled to build a statistical sample set for shape feature extraction. Preferably, a pattern that is randomly based on the light intensity and perception of the task will be used to build the statistical sample. For example, that pattern may be based on perceiving a single subject or a group of subjects. Such perception tasks may require different sampling tactics. Saccadic eye movement was recorded by Yabus, 1950 (see FIG. 21). Embodiments of the present invention emulate this approach as shown in FIG. 21.

Figure 22:
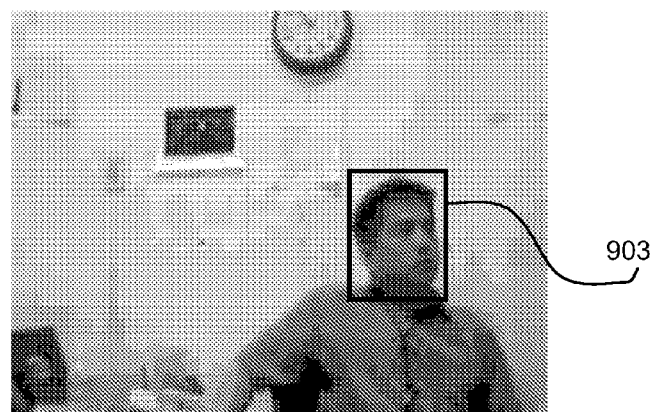
FIG. 22 shows a sample scene and a subject from which shape features are extracted.
Figure 23A:
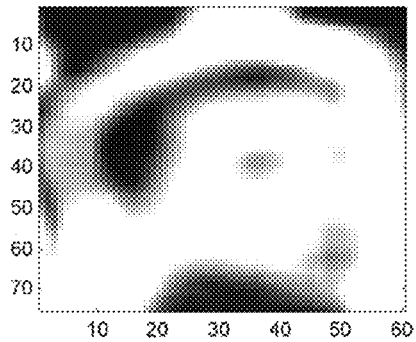
FIGS. 23A-23E depict the shape features extracted from the subject shown in FIG. 22.
Figure 23B:
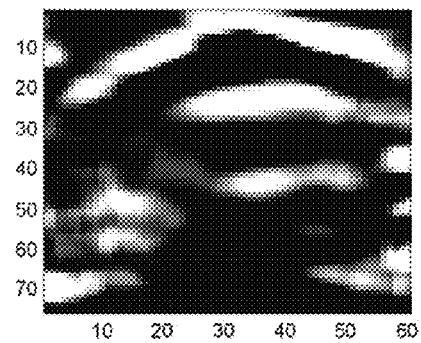
Figure 23C:
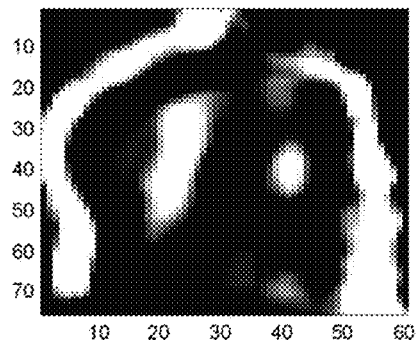
Figure 23D:
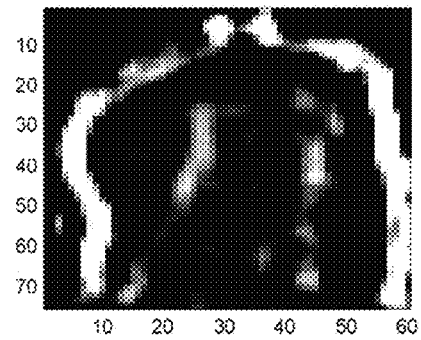
Figure 23E:
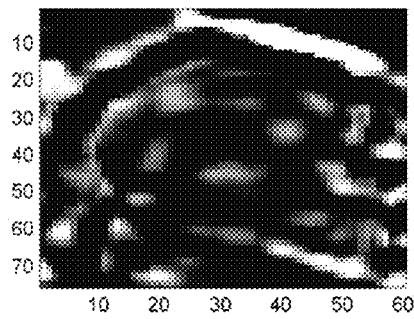

FIG. 22 shows a sample scene and a window 903 around a subject from whom shape features are to be extracted. FIGS. 23A-23E show five features extracted from the subject within the window according to embodiments of the present invention. As seen in FIG. 23A-23E, the various features may be predominated by general shape of the head, the positions of the eyes relative to the hair, etc.

As discussed above in regard to Equations 1-5, a Dominant-Element-Based Gradient Descent and Dynamic Initial Learning Rate technique may be used for shape feature extraction according to some embodiments of the present invention. Embodiments of the present invention using such a technique may allow for a relatively simple and optimized hardware architecture for shape feature extraction. Other embodiments of the present invention may use alternative approaches for shape feature extraction.

Described below are two experiments that were conducted based on a bio-inspired shape feature approach according to embodiments of the present invention. In the first experiment, PCA feature extraction was performed for static object recognition. In the second experiment, PCA feature extraction was performed for dynamic object recognition.

In the first experiment, an image retrieval application based on object recognition is addressed, where the image database and searched image are available. For example, a search may be performed for a specific person whose appearance is known from a Department of Motor Vehicles driver license image database. In this application, only a single image is obtained and used as an image input to prompt the database for the best match.

Figure 1:
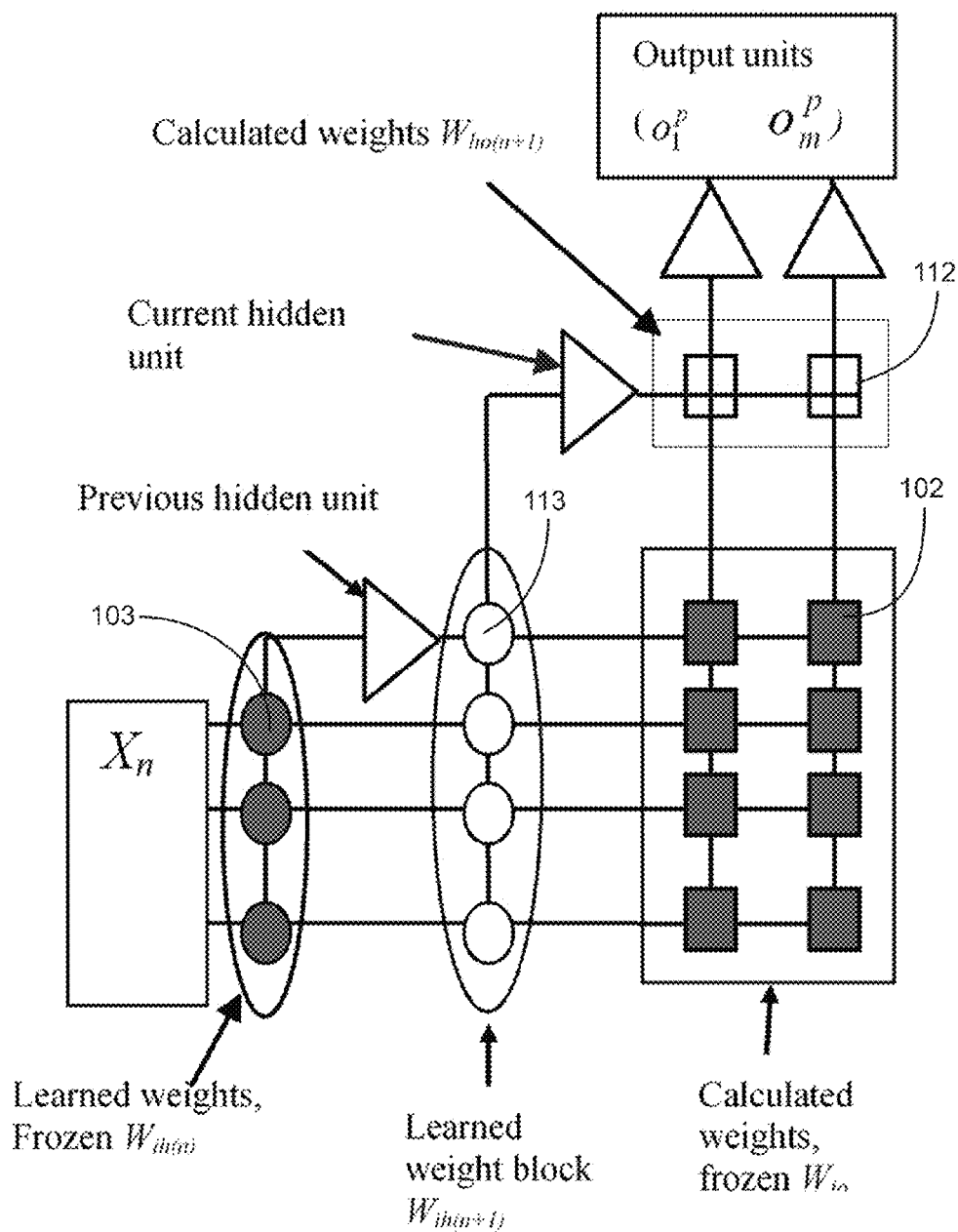
FIG. 1 (prior art) illustrates a Cascade Error Projection neural network architecture.
Figure 2:
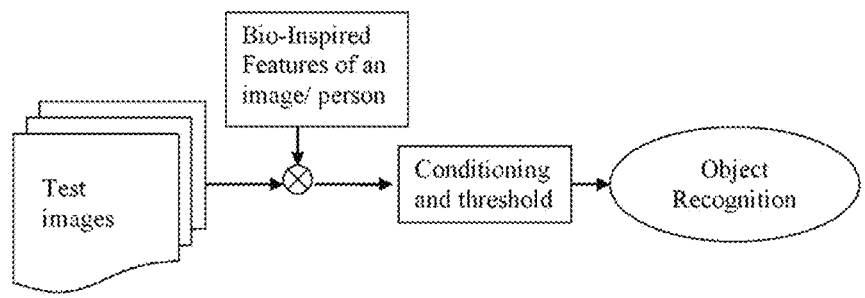
FIG. 2 illustrates a processing architecture for recognizing bio-inspired features of an image or person in images.

For the experiment, a database of 1520 images (286×384 pixel resolutions) of 23 different persons was used. This database may be available via the Internet at the website http://www.humanscan.de/support/downloads/facedb.php. In the experiment, a single image of one random person at a time was used for bio-inspired feature extraction. Three bio-inspired features of an image of each person were used. The processing architecture for processing the images is shown in FIG. 2

Figure 3A:
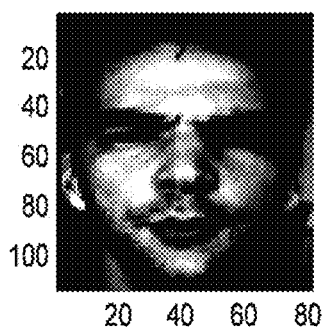
FIGS. 3A-3C show training images for persons selected from an image database.
Figure 3B:
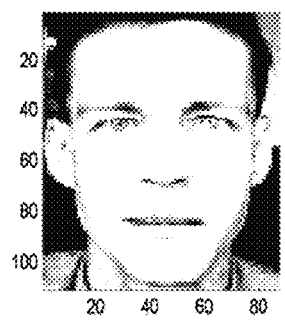
Figure 3C:
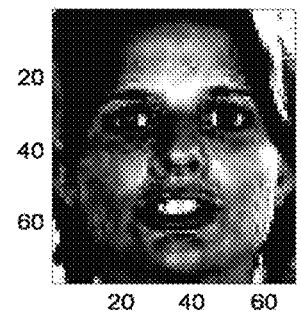

3 persons of the 23 persons in the database were selected and a selected image per person was chosen. The selected images are shown in FIGS. 3A, 3B and 3C. Each image was resized to 50% of the original in order to improve processing time. These images were processed to obtain three bio-features (eigen vectors) for each selected image. These feature vectors were then used to correlate through a test image to find the maximum correlation within it. The maximum correlation values for each of the 1520 images in the database where then thresholded to determine whether the image belonged to the same person.

FIGS. 4A-4C show the images in the database for the person shown in FIG. 3A. In the experiment, the images shown in FIGS. 4A and 4B were correctly selected, while the image shown in FIG. 4C was missed. Similarly, FIGS. 5A and 5B show the images correctly selected based on FIG. 4B, while FIG. 5C shows a missed image. Finally, FIGS. 6A and 6B show the images correctly selected based on FIG. 4C, while FIG. 6C shows a missed image.

The experiment was based on the use of one sample image, since, in real world applications, only a single image may be available for performing recognition. Moreover, the search results may depend on the users' desire by controlling the threshold value to obtain a pool of candidate matches and its size.

In this experiment, the constraints were not only to maximize the percentage of correct recognition, but also maintain a good generalization capability. Per each sample image/person, only about 2.4% of the total image of person had to be inputted to the system. Based on that input, the average correct recognition was about 55% of that person's appearance in the entire database. To obtain that percentage, the threshold controlled values ere relaxed, which introduced more false positives. Simulation results are shown in Table I.

TABLE I

| Features | F1 | F1&F2 | F1-F3 | Comments |
|---|---|---|---|---|
| Percentage of correct recognition with positive false alarm | 86% | 92% | 94.2% | With one sample input per person (2.4%) and 55% correct generalization (20 different images of the same person) |
| Percentage of correct recognition with no positive false alarm | 96.7% | ... | ... | 15% correct generalization (7 different images of the same person) with no positive false alarm |

Figure 7:
FIG. 7 shows a series of images for the person shown in FIG. 3A.

As shown in Table I, 96.7% correct recognition with no positive false alarm using only one feature (F1) was obtained with the relaxation of the generalization to 15% (instead of 55%) correct recognition of a person appearance in the entire database (with 2.4% input image or one image/per person) with no positive false alarm using only one feature (F1). For example, the first feature (F1) of the person in FIG. 3A was used to recognize the same person in all pictures shown in FIG. 7.

The simulation results were excellent due to the simplified and practical model. Moreover, the scaling and rotation tolerances are observed in this approach. The time consuming from selecting the object (face) to feature extraction and search for 1520 images is about 924 seconds.

The discussion above addresses static object recognition, that is, recognition of an object from a series of still pictures. However, dynamic object recognition, where an object is recognized from a series of images in which the object to be recognized is moving through a scene, provides additional applications in a real world environment e.g., intelligent video search etc. Hence, a practical model for dynamic object recognition would be useful.

In an embodiment according to the present invention, bio-inspired shape features of an object are obtained. These features are then used to detect the object in the new scene based on their correlations. The correlation value of each shape feature corresponding to the similar raw image must be closest to eigen value of each corresponding feature vector (eigen vector). After the object is detected, then the newly found object is automatically feedback into the extraction processes so that new features may be extracted.

The applicability of this approach was studied by testing moving object recognition using grayscale images. Due to the use of grayscale images, only the adaptive shape feature approach is employed. This study demonstrates the adaptive shape feature mechanism and moving object recognition approach and shows the applicability of such an approach in a shape and color feature mechanism approach according to an embodiment of the present invention.

Figure 8:
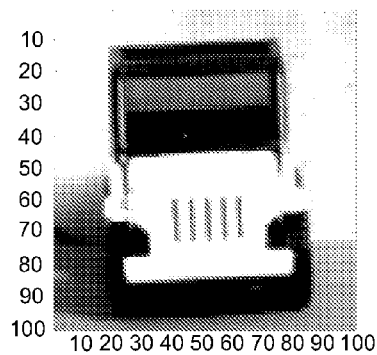
FIG. 8 shows a moving object sampled from a scene.

A moving car object acquired from the USC-SIPI Image Data Base (available at in http://sipi.usc.edu/database/) was used as a benchmark. This sequencing image is carefully designed to show that the car has moved in the orthogonal direction to avoid a trivial movement. FIG. 8 shows a moving object (100×100) sampled from a scene. Only one feature (eigen vector) was used for the subsequent object recognition discussed below.

Figure 9A:
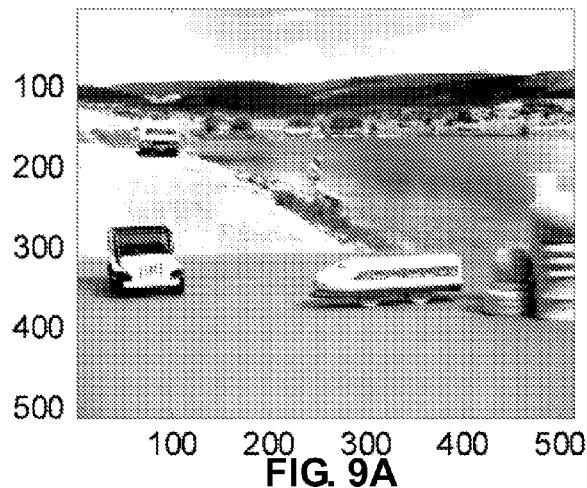
FIG. 9A shows a test image and FIG. 9B shows a detected object found in the test image based on the object shown in FIG. 8.
Figure 9B:
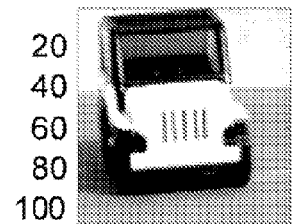
Figure 10A:
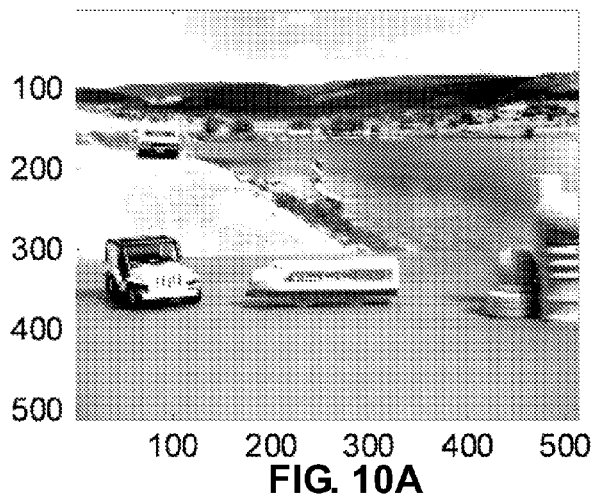
FIG. 10A shows another test image and FIG. 10B shows a detected object found in the test image based on the object shown in FIG. 8.
Figure 10B:
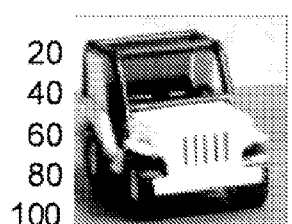

FIG. 9A shows a test image and FIG. 9B shows the detected object found in the test image that is the same as the initial object shown in FIG. 8. Similarly, FIG. 10A shows another test image and FIG. 10B shows the detected object found. FIG. 11A shows still another test image and FIG. 11B shows the detected object. FIG. 12A shows still another test image and FIG. 12B shows the detected object. FIG. 13A shows still another test image and FIG. 13B shows the detected object. Finally, FIG. 14A shows still another test image and FIG. 14B shows the detected object. As shown by these figures, the bio-inspired shape feature successfully detected the moving car based on adaptive shape feature in the dynamic scene. However, note that a fixed window size was used in this simulation, so the detected objects are not fully exposed in the window, as shown in FIGS. 9B, 10B, 11B, 12B, 13B and 14B.

The embodiments described utilize powerful bio-inspired feature extraction, fast PCA processing techniques and adaptive shape feature architecture and autonomous feedback mechanism for object detection and recognition. The combination of these techniques enables real time adaptive capability, which can be an effective technique to address object recognition in a changing environment.

In a heterogeneous environment, the shape of an object may itself expose difficulties to recognition when: a) the object change violates the assumption of a "smooth" transition from which the adaptive approach may not be sufficient; or b) an ambiguous environment exists where several similar types of objects exist. To deal with this issue, the color features of an object may be used to extend a new dimension of search. Color segmentation may be an optimal technique to be used to assist the shape feature for object recognition. Color segmentation techniques known in the art are discussed above, including those using algorithms with fast learning and adaptive capabilities, such as the CEP algorithm. Embodiments of the present invention may use the CEP algorithm and the CEP neural network architecture for object color feature detection and extraction.

A challenging aspect in color segmentation is when the light intensity and resolution are dynamically changing. The initial knowledge used to train the CEP network will have very little effect at a new location and therefore will need to be updated through learning of newly extracted data. When the network that has acquired current color knowledge at time $t_0$ is used to test the subsequent image at time $t_0+\Delta t$, segmentation results from the image at $t_0+\Delta t$ will be used to extract the training set to update the previous knowledge of the network at time $t_0$. This process of repeatedly segmenting and updating is performed as long as the operation is going on.

While the process of segmenting and updating are desired characteristics of an adaptive processing, there is an issue as to how often such updates are necessary. The problem with infrequent updates, however, is that the network may not interpolate easily based upon new images from which the newly segmented data may be insufficient for training. To find the optimal sampling rate, $\Delta t$ must be "sufficiently small" and will depend upon the moving velocity and other environmental changes.

A simulation of the color feature extraction using images having environmental features was performed. To classify each pixel in the images, a pixel to be classified and its immediate neighbors were used to form a 3×3 sub-window as the input training pattern (thus each input pattern has 27 elements from 3×3 of RGB pixel). Based on a previous study (see E. Fiesler, S. Campbell, L. Kempen, and T. Duong. "Color Sensor and Neural Processor on One Chip." International Symposium on Optical Science, Engineering, and Instrumentation, Proc. of the SPIE, vol. 3455 'Applications and Science of Neural Networks, Fuzzy Systems, and Evolutionary Computation', pp. 214-221, 1998), the 3×3 RGB input pattern was found to be the optimal size in comparison to using a single pixel RGB input, a 5×5 pixel RGB sub-window, or a 7×7 pixel RGB sub-window. In this simulation, the objective was to segment the image into three groups: "Rock1", "Rock2", and "Sand". The topology of the CEP network in the simulation was a 27×5×3 cascading architecture neural network, having 27 inputs, 5 cascaded hidden units, and 3 output units.

Figure 15A:
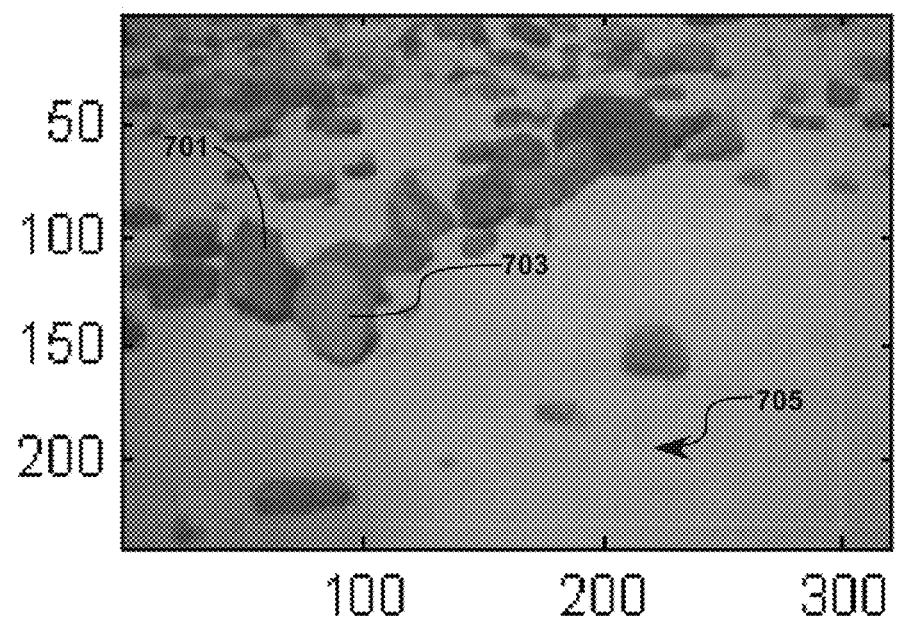
FIG. 15A shows an image of an environmental scene and FIG. 15B shows a segmented representation of the image shown in FIG. 15A.
Figure 15B:
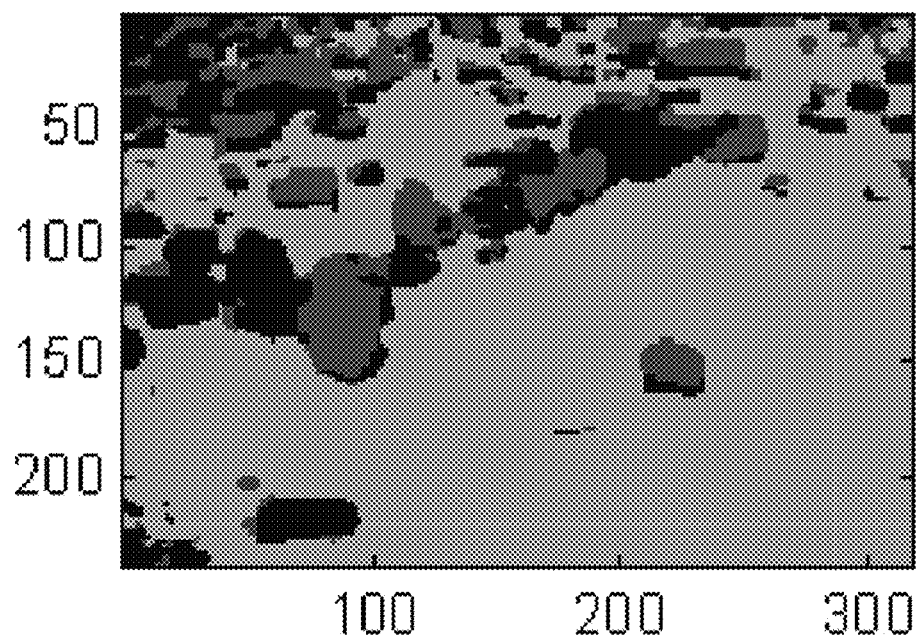

FIG. 15A shows an image of an environmental scene at 3 PM. FIG. 15 A shows "Rock1" 701, "Rock2" 703, and "Sand" 705. This image was sampled and 408 patterns were collected for training data, 588 patterns were collected for cross validation, and 1200 patterns were collected for training. With these sample sets, the learning was completed with 91% correct in training, 90% correct in validation, and 91% correct in testing. After training was performed, FIG. 15B shows the segmented output of the original image shown in FIG. 15A.

Figure 16A:
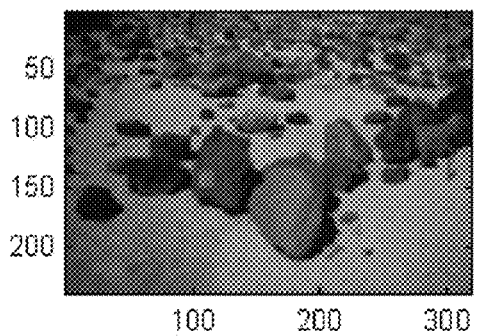
FIG. 16A shows a later image of the scene shown in FIG. 15A.
Figure 17A:
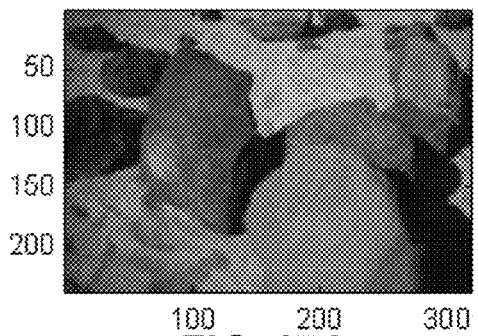
FIG. 17A shows a later image of the scene shown in FIG. 15A.
Figure 16B:
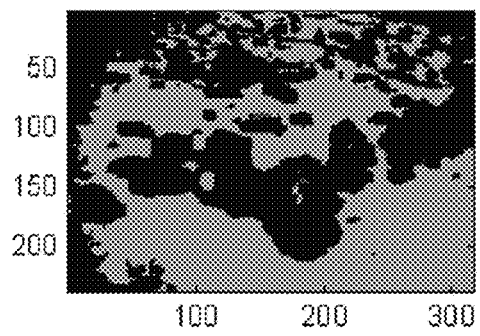
FIG. 16B shows a segmented image based on previous training data from the image shown in FIG. 15A.
Figure 17B:
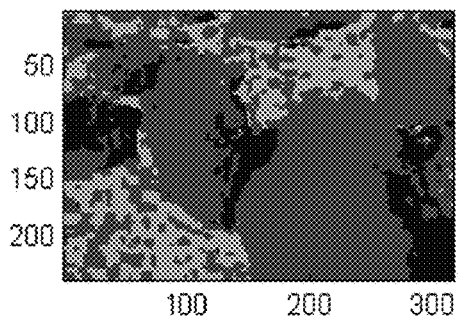
FIG. 17B shows a segmented image based on previous training data from the image shown in FIG. 16A.
Figure 16C:
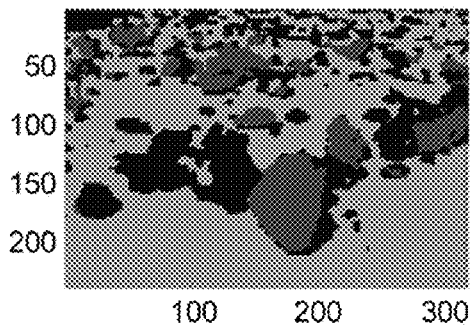
FIG. 16C is a segmented image resulting from intermediate knowledge through adaptive learning.
Figure 17C:
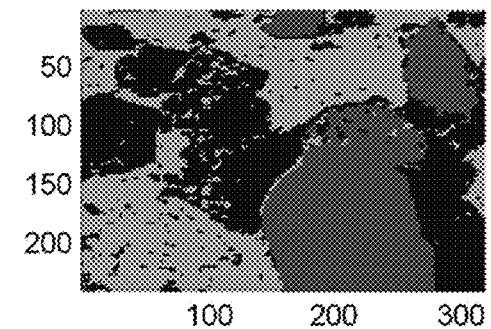
FIG. 17C is a segmented image resulting from intermediate knowledge through adaptive learning.

With the knowledge acquired in FIG. 15A, the network was tested with the image input shown in FIG. 16A that was collected at 4:00 PM (resulting in both a positional change of the objects of interest and a change in the shadows associated with the objects). The output result is shown in FIG. 16B (where the segmented image is based on training data from the image shown in FIG. 15A where no intermediate adaptation step was performed). FIG. 16C is an output result with the network acquired from the intermediate knowledge through adaptive learning. In a similar manner, the original image shown in FIG. 17A was collected at 5 PM. FIG. 17B is the segmented image with the previous training set at 4 PM and FIG. 17C is the segmented image with intermediate adaptive step.

Based on the aforementioned results, it may be concluded that the adaptive technique is needed to obtain better segmentation when the environment is changing rapidly.

As discussed earlier, the role of shape feature itself carries substantial information for recognition while the color feature may help to ease the unexpected event which may often occur in the heterogeneous environment. Embodiments of the present invention utilize an integration of the shape and color feature based approaches. Such an integration of approaches helps strengthen object recognition to meet object recognition challenges of real world applications.

Figure 18:
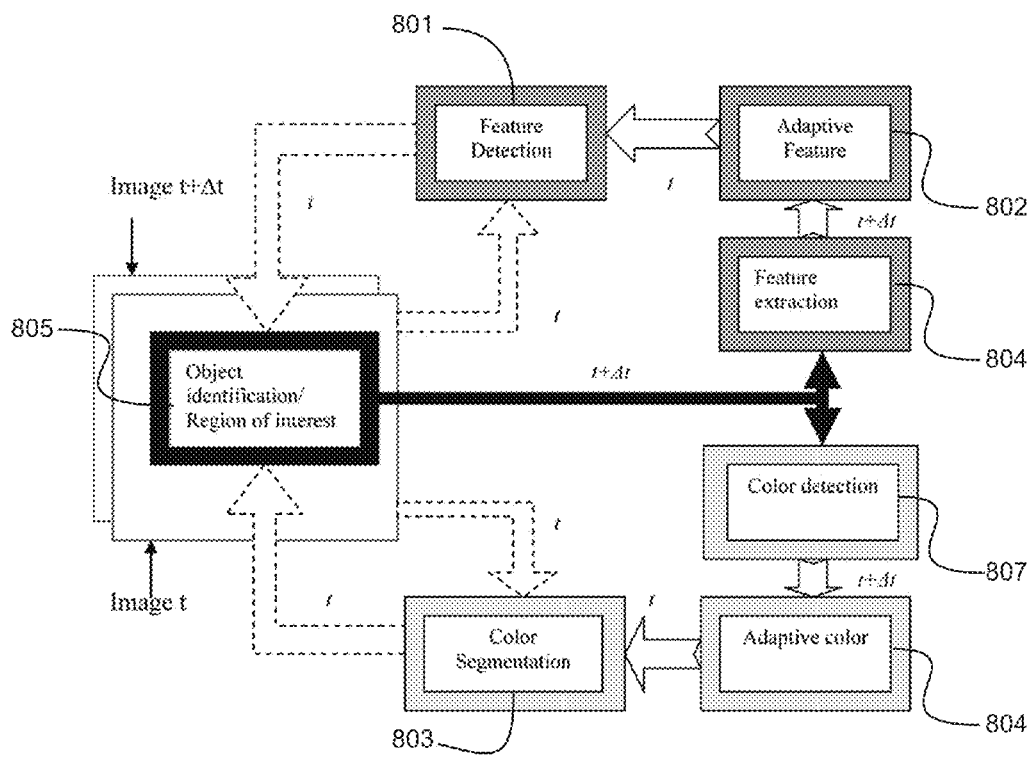
FIG. 18 shows a flow chart for object recognition using shape and color feature integration.

FIG. 18 shows a flow chart of an embodiment according to the present invention having shape and color feature integration. As shown in FIG. 18, feature extraction 806 is performed on a statistical image collection (either single or multiple) to create an initial knowledge of shape feature(s) that is stored in an adaptive shape feature database 802. Similarly, color detection 807 is performed on a statistical image collection (either single or multiple) to create an initial knowledge of color feature(s) that is stored in an adaptive color feature database 807. At time t, an object or region of interest 805 is tested and found based on an initial shape and color feature. Then, feature extraction 805 is performed on the object or region of interest 805 to get a new shape feature or features and color detection 807 (preferably via segmentation) is performed to get a new color feature or features at time t+Δt. If there is a significant difference between the previous and new features, the color or shape features will be updated and stored in the feature database From the previous shape adaptive features and color adaptive features stored in the shape feature database 802 and color feature database 804, respectively, the object identification and region of interest 805 are found from the image at time t via feature detection 801 and color segmentation 803. The region of interest 805 will be used as sample data to adapt new shape and color features for the image at time t+Δt.

A simulation using an embodiment of the present invention was performed to determine its effectiveness in autonomous object recognition. In the simulation, object recognition of a moving target was performed. The simulation was based on video recorded at a shopping mall in Southern California. This application demonstrates that the bio-inspired object recognition based on shape and color can be effective to recognize an interested person in the heterogeneous environment where a single technique, e.g., shape or color, may have difficulties in performing effective recognition. This simulation also demonstrates the mechanism and architecture of an autonomous adaptive system having practical uses.

Figure 19A:
FIG. 19A shows an initial scene and FIG. 19B shows a selected object within that scene.
Figure 19B:
Figure 20:
FIG. 20 shows a video sequence of images containing the object shown in FIG. 19B.

FIG. 19A shows the initial scene and FIG. 19B shows the selected object. When the object is selected, it is extracted to obtain its shape and color features. For this simulation, only one shape feature and three color features: face skin, hair and background, were used. The initial knowledge such as shape, face skin color, hair color, and background of the object were obtained and used to validate the new scene. FIG. 20 shows the sequences of the video. The recognition of the object performed by an embodiment of the invention is shown in the upper left corner of each image. This sequence of video images shows the variation of the dynamics in heterogeneous environment and shows that the movements of the person of interest to show the rotation and scaling of his face in a changing background. Hence, this video represents a realistic environment for object recognition. The simulation results demonstrate that an embodiment of the present invention provides recognition capabilities in a complex situation.

In a static object recognition situation, a generalized constraint was modified so as to maximize the recognition capability of the same object from different perspectives. The expectation of having very limited information (one input object image) but with a large recognition capability is very attractive. Practically and theoretically, a local extrapolation of the input object under local rotation and image scaling should be expected, but not much more. If so, simulation results suggest that embodiments of the present invention may be effective as shown in Table I (second row result) with no false alarms, full recognition, and a correct locally rotated image of the object. This result can be viewed as sampling the finite resolution space of a 3-D modeling approach. This 3-D modeling can then be used to solve the 3-D rotation of an object.

In pattern recognition, scaling of an object is also an issue of great concern and difficult to deal with optimally. From a bio-inspired perspective, the bipolar layer can be modeled to obtain the scaling ratio between the reference object and the potential object. The bio-inspired bipolar layer as an edge feature of the object is used in Cellular Neural Network (CNN) as described by F. Werblin, T. Roska, and L. O. Chua in "The analogic cellular neural network as a Bionic Eye", International J. Circuit Theory and Applications, Vol. 23, pp. 541-569, 1995. A Visual Cortex-like approach (see, for example, Thomas Serre, Lior Wolf, Stanley Bileschi, Maximilian Riesenhuber, and Tomaso Poggio, "Robust Object Recognition with Cortex-Like Mechanisms", IEEE Transactions On Pattern Analysis And Machine Intelligence, Vol. 29, No. 3, 411-426, March 2007) has employed multiple window resolution and rotation to deal with it effectively; however, this approach may not be an optimal one.

Embodiments of the present invention may rely on bio-inspired feature extraction based on saccadic eye movements and vertebrate retina (horizontal layer), but, generally, no scaling or rotations are employed. However, scaling and rotation tolerances are observed in the simulation results shown in the figures above. Additional embodiments may tolerate increased amounts of rotation. One may effectively employ a multiple rotation scheme to cover 3-D rotation. For example, if a 30° rotation can be tolerated, it will require 144 (12×12) rotation positions to cover a complete 360° view of a 3-D rotation. In the dynamic object recognition, the local rotation and scaling can be tolerated and adaptively learned from the adaptive architecture and autonomous feedback mechanism according to embodiments of the present invention.

For applications related to dynamic image processing, e.g., object recognition search or visual surveillance and monitoring, processing time is always a crucial parameter. It is hoped that results are obtained within a valid time frame; otherwise, they may not be valid. Specially, embodiments of the present invention do not rely on local spatial-temporal information, but, rather rely on global spatial-temporal information of an object. Hence, required processing time is more extensive. JPL-SPCA demonstrated that about 2-3 min. vs. 6 hours (using MATLAB) was needed to extract the features of an array (100×10000). For the static object search, the time consumed is about 0.6 sec to completely examine whether an object (e.g., 112×83) is in an image and 3.4 sec of an object search (90×60) in an image array for dynamic object recognition search. These timing numbers above are upper-bound values and can be reduced by parallel processing, skip frame or heuristic reduced search window etc. to meet the timing budget for each application. Moreover, hardware approaches like 3-D Artificial Neural Network (3-DANN, see T. A. Duong, S. Kemeny, T. Daud, A. Thakoor, C. Saunders, and J. Carson, "Analog 3-D Neuroprocessor for Fast Frame Focal Plane Image Processing," The Industrial Electronics Handbook, Chap. 73, Ed.-In-Chief J. David Irwin, CRC PRESS, 1997) can improve the speed performance.

No limitation is intended by the description of exemplary embodiments which may have included tolerances, feature dimensions, specific operating conditions, engineering specifications, or the like, and which may vary between implementations or with changes to the state of the art, and no limitation should be implied therefrom. In particular it is to be understood that the disclosures are not limited to particular compositions or biological systems, which can, of course, vary. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. It is also to be understood that the terminology used herein is for the purpose of describing particular embodiments only, and is not intended to be limiting. Reference to a claim element in the singular is not intended to mean "one and only one" unless explicitly so stated. As used in this specification and the appended claims, the singular forms "a," "an," and "the" include plural referents unless the content clearly dictates otherwise. The term "several" includes two or more referents unless the content clearly dictates otherwise. Unless defined otherwise, all technical and scientific terms used herein have the same meaning as commonly understood by one of ordinary skill in the art to which the disclosure pertains.

Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . ."

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A method for object identification in multiple images in a series of images, the method comprising:
    extracting initial knowledge of color and shape features from a statistical image collection and storing the extracted color and shape features in one or more databases;
    performing shape feature detection and color feature detection on a first image in the series of images to identify an object and a region of interest within the first image, wherein the shape feature detection and color feature detection is based on the color and shape features stored in the one or more databases;
    extracting new color and shape features based on the identified region of interest and storing the new extracted color and shape features in the one or more databases;
    performing shape feature detection and color feature detection on a next image in the series of images to identify the object and a region of interest within the next image, wherein the shape feature detection and color feature detection is based on the color and shape features stored in the one or more databases; and
    repeatedly extracting new color and shape features followed by performing shape feature detection and color feature identification to identify the object in multiple images in the series of images,
    wherein the statistical image collection comprises color and shape features mapped into a statistical form based on saccadic eye movements.

2. The method according to claim 1, wherein color feature detection comprises color segmentation.

3. The method according to claim 1, wherein extracting shape features and performing shape feature detection comprises performing Principal Component Analysis on the region of interest with shape features stored in the one or more databases.

4. The method according to claim 2, wherein extracting color features and performing color feature detection comprises processing the region of interest and color features stored in the one or more databases with a Cascade Error Projection algorithm.

5. The method according to claim 1, wherein the identified object comprises a human being or some portion of a human being.

6. The method according to claim 5, wherein the portion of the human being relates to a human head and the new color and shape features comprise: head shape; face skin color; hair color, and background color.

7. The method according to claim 5, wherein the portion of the human being relates to a human face and the new color and shape features comprise: mouth shape and eye shape.

8. The method according to claim 1, wherein the series of images comprises a series of video images.

9. A computer programmed for recognition of an object in multiple images of a series of images comprising:
    one or more databases for storing color and shape features extracted from a statistical image collection containing images of objects to be recognized;
    one or more processors programmed to extract shape features from a region of interest or an object of interest within an image and store the extracted shape features in the one or more databases;
    the one or more processors being further programmed to extract color features from a region of interest or an object of interest within an image and store the extracted color features in the one or more databases;
    the one or more processors being further programmed to detect shape features and color features within an image or a region of interest based on shape features stored in the one or more databases to recognize an object with the image or the region of interest;
    the one or more processors programmed to extract shape features and color features being further programmed to extract shape features and color features from the recognized object or region of interest,
    wherein the one or more processors are further programmed to provide an indication of the presence of the recognized object in one or more images of the series of images and wherein the statistical image collection comprises color and shape features mapped into a statistical form based on saccadic eye movements.

10. The computer programmed for recognition of an object according to claim 9, wherein the one or more processors further programmed to detect color features are programmed to perform detection based on color segmentation.

11. The computer programmed for recognition of an object according to claim 9, wherein the one or more processors programmed to extract shape features and further programmed to detect shape features and color features are programmed to perform Principal Component Analysis on the region of interest with shape features stored in the one or more databases.

12. The computer programmed for recognition of an object according to claim 10, wherein the one or more processors programmed to extract color features and further programmed to detect shape features and color features are programmed to process the region of interest and color features stored in the one or more databases with a Cascade Error Projection algorithm.

13. The computer programmed for recognition of an object according to claim 9, wherein the recognized object comprises a human being or some portion of a human being.

14. The computer programmed for recognition of an object according to claim 13, wherein the some portion of the human being relates to a human head and the color and shape features comprise: head shape; face skin color; hair color, and background color.

15. The computer programmed for recognition of an object according to claim 13, wherein the some portion of the human being relates to a human face and the color and shape features comprise: mouth shape and eye shape.

16. The computer programmed for recognition of an object according to claim 9, wherein the series of images comprises a series of video images.

17. The method according to claim 1, wherein performing shape feature detection and color feature detection comprises selecting multiple samples within the first image or next image and wherein locations of the multiple samples are selected based on saccadic eye movement.

18. The computer according to claim 9, the one or more processors programmed to extract shape features and color features being further programmed to select multiple samples within the image or the region of interest and wherein locations of the multiple samples are selected based on saccadic eye movement.

19. The method according to claim 17, wherein the statistical image collection comprises statistical samples of sample images and wherein the statistical samples are generated from a random pattern based on light intensity.

20. The computer according to claim 18, wherein the statistical image collection comprises statistical samples of sample images and wherein the statistical samples are generated from a random pattern based on light intensity.

* * * * *